(12) United States Patent
Xu et al.

(10) Patent No.: US 8,063,150 B2
(45) Date of Patent: Nov. 22, 2011

(54) HIGH PURITY TRANSPARENT PERFLUOROELASTOMER PARTS AND A PROCESS TO PRODUCE THE SAME

(75) Inventors: Ping Xu, Hockessin, DE (US); Jack Hegenbarth, Wilmington, DE (US); Xin Kang Chen, Shanghai (CN); Jian Hou, Shanghai (CN)

(73) Assignee: Gore Enterprise Holdings, Inc., Newark, DE (US)

( * ) Notice: Subject to any disclaimer, the term of this patent is extended or adjusted under 35 U.S.C. 154(b) by 276 days.

(21) Appl. No.: 12/346,970

(22) Filed: Dec. 31, 2008

(65) Prior Publication Data
US 2010/0047498 A1    Feb. 25, 2010

Related U.S. Application Data

(62) Division of application No. 11/136,853, filed on May 25, 2005, now Pat. No. 7,488,781.

(51) Int. Cl.
*C08F 8/00*    (2006.01)

(52) U.S. Cl. ............... 525/326.3; 524/544; 524/545

(58) Field of Classification Search .............. 525/326.3; 524/544, 545
See application file for complete search history.

(56) References Cited

U.S. PATENT DOCUMENTS

| | | | |
|---|---|---|---|
| 4,281,092 A | 7/1981 | Breazeale | |
| 4,394,489 A | 7/1983 | Aufdermarsh | |
| 4,956,400 A | 9/1990 | Kozakiewicz et al. | |
| 5,260,351 A | 11/1993 | Logothetis | |
| 5,498,657 A | 3/1996 | Sugiyama et al. | |
| 5,554,680 A | 9/1996 | Ojakaar | |
| 5,565,512 A | 10/1996 | Saito et al. | |
| 5,789,489 A | 8/1998 | Coughlin et al. | |
| 5,789,509 A | 8/1998 | Schmiegel | |
| 5,880,213 A | 3/1999 | Wu et al. | |
| 6,037,399 A | 3/2000 | Wu et al. | |
| 6,114,452 A | 9/2000 | Schmiegel | |
| 6,395,834 B1 | 5/2002 | Albano et al. | |
| 6,703,461 B1 | 3/2004 | Tanaka et al. | |
| 6,720,360 B1 * | 4/2004 | Grootaert et al. | 521/28 |
| 6,756,445 B1 | 6/2004 | Irie et al. | |
| 6,943,228 B2 | 9/2005 | Grootaert et al. | |
| 6,992,143 B2 * | 1/2006 | Wang | 525/326.3 |
| 7,019,083 B2 | 3/2006 | Grootaert et al. | |
| 2002/0177666 A1 | 11/2002 | Grootaert et al. | |
| 2003/0220442 A1 | 11/2003 | Epsch et al. | |
| 2004/0024134 A1 | 2/2004 | Grootaert et al. | |
| 2004/0087703 A1 | 5/2004 | Kaspar et al. | |

(Continued)

FOREIGN PATENT DOCUMENTS

EP    0 708 139    4/1996

(Continued)

OTHER PUBLICATIONS

Odian, George, "Principles of Polymerization" 4th Ed. p. 367.

(Continued)

*Primary Examiner* — Peter D. Mulcahy
*Assistant Examiner* — Henry Hu
(74) *Attorney, Agent, or Firm* — Amy L. Miller

(57) ABSTRACT

Crosslinkable perfluoroelastomer compositions having low metal content and low compression set when crosslinked, and processes for producing the same, are provided. Compositions comprising terpolymers of TFE, PAVE, and CNVE having a metal content of less than 3000 ppb may be formed into high purity transparent perfluoroelastomer parts.

30 Claims, 2 Drawing Sheets

Curing kinetics obtained at 250°C (Example 4)

U.S. PATENT DOCUMENTS

| | | |
|---|---|---|
| 2004/0122163 A1 | 6/2004 | Grootaert et al. |
| 2004/0143052 A1 | 7/2004 | Epsch et al. |
| 2004/0147676 A1 | 7/2004 | Irie et al. |
| 2004/0167290 A1 | 8/2004 | Grootaert et al. |
| 2005/0100728 A1 | 5/2005 | Ristic-Lehmann et al. |

FOREIGN PATENT DOCUMENTS

| | | |
|---|---|---|
| EP | 0 829471 | 3/1998 |
| EP | 1097948 | 3/1999 |
| EP | 1097948 A1 * | 3/1999 |
| EP | 1 243 617 | 9/2002 |
| EP | 1 464 671 | 10/2004 |
| WO | 01/57100 | 8/2001 |
| WO | WO-01/57100 A1 * | 8/2001 |
| WO | 02/48200 | 6/2002 |
| WO | 02/060968 | 8/2002 |
| WO | 2004/011510 | 2/2004 |
| WO | 2004/060944 | 7/2004 |
| WO | 2005/066218 | 7/2005 |
| WO | WO-2006/127218 A1 * | 11/2006 |

OTHER PUBLICATIONS

Hawley's Condensed Chemical Dictionary, 11th Ed., p. 521.
Restriction Requirement, Sep. 28, 2007, U.S. Appl. No. 11/136,853.
Non-Final Rejection, Mar. 17, 2008, U.S. Appl. No. 11/136,853.
Non-Final Rejection, Nov. 10, 2005, U.S. Appl. No. 11/136,744.
Response to Nov. 10, 2005 Non-Final Rejection, Feb. 17, 2006, U.S. Appl. No. 11/136,744.
Non-Final Rejection, Apr. 20, 2006, U.S. Appl. No. 11/136,744.
Interview Summary, Jul. 26, 2006, U.S. Appl. No. 11/136,744.
Response to Apr. 20, 2006 Non-Final Rejection, Aug. 4, 2006, U.S. Appl. No. 11/136,744.
Non-Final Rejection, Sep. 20, 2006, U.S. Appl. No. 11/136,744.
Response to Sep. 29, 2006, U.S. Appl. No. 11/136,744.
Non-Final Rejection, May 16, 2007, U.S. Appl. No. 11/136,744.
Interview Summary, Nov. 5, 2007, U.S. Appl. No. 11/136,744.
Response to May 16, 2007 Non-Final Rejection, Nov. 9, 2007, U.S. Appl. No. 11/136,744.
Non-Final Rejection, Jan. 8, 2008, U.S. Appl. No. 11/136,744.

* cited by examiner

Figure 1. Curing kinetics obtained at 250°C (Example 2)
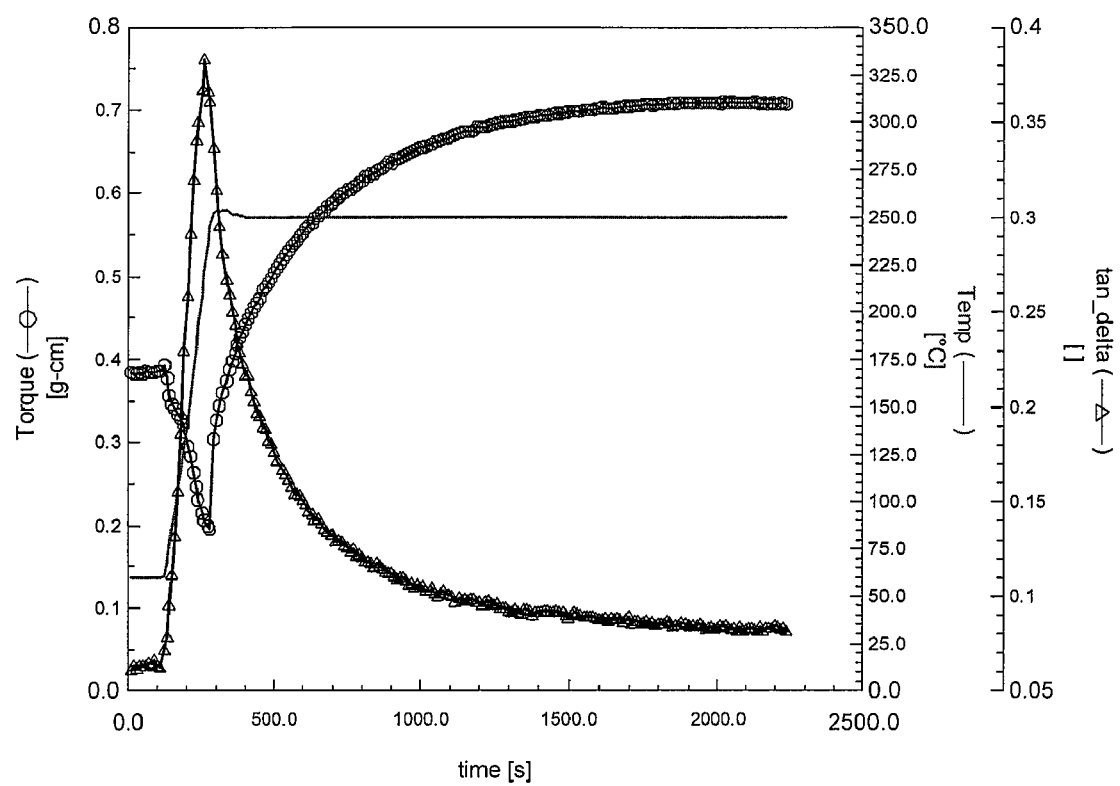

Figure 2. Curing kinetics obtained at 250°C (Example 4)
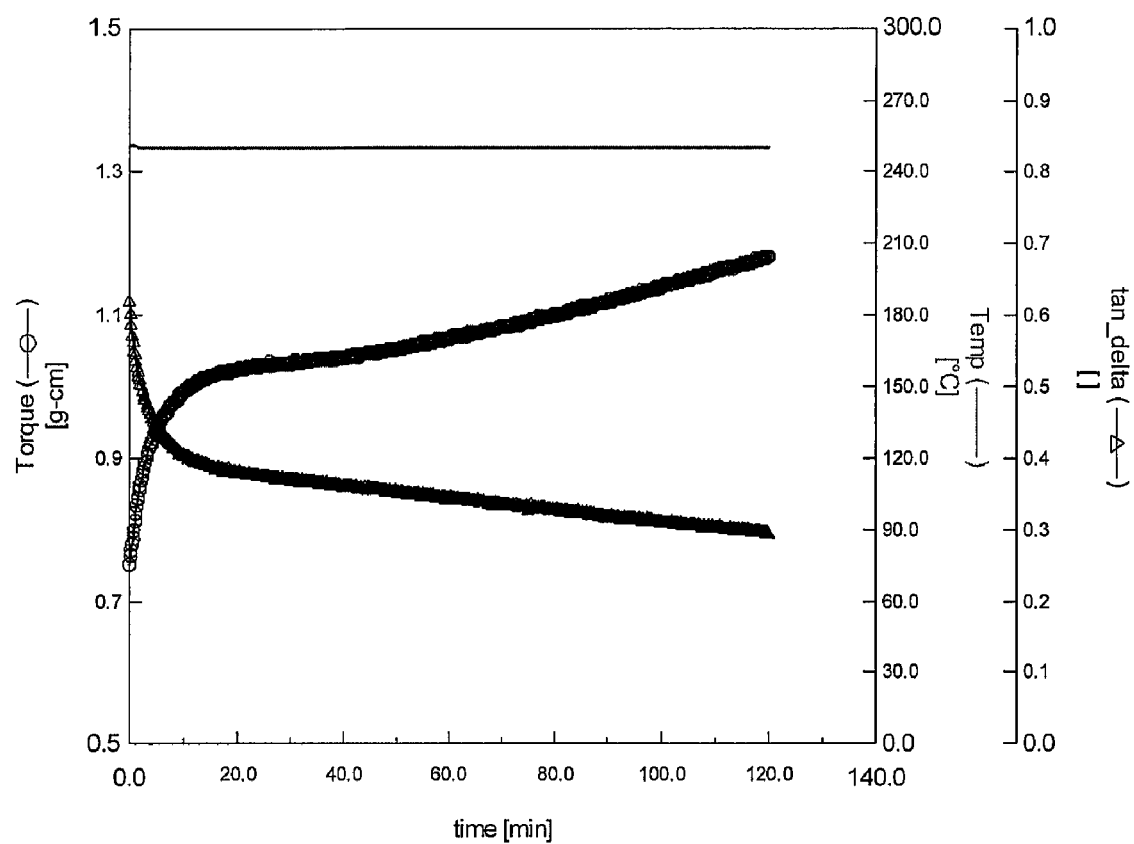

HIGH PURITY TRANSPARENT PERFLUOROELASTOMER PARTS AND A PROCESS TO PRODUCE THE SAME

CROSS REFERENCE TO RELATED APPLICATIONS

This application is a divisional of application Ser. No. 11/136,853, filed May 25, 2005 now U.S. Pat. No. 7,488,781.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in semiconductor manufacturing equipment, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene (TFE) and perfluoro(alkyl vinyl)ethers (PAVE). In order to develop elastomeric properties fully, perfluoroelastomers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene are especially preferred. Such compositions are described, for example, in U.S. Pat. Nos. 4,281,092; 4,394,489; 5,789,489; and 5,789,509.

The polymerization processes of perfluoroelastomers are most typically done in the presence of a perfluoro carboxylic acid salt or fluorinated sulfonic acid salt. If the salt contains a metal ion, it contaminates the formed polymer. If the salt is a non-metal, usually the resulting pH of the polymerization media is acidic leading to corrosion of polymerization vessel or downstream lines and vessels, and subsequent contamination of the resulting polymer. Further, coagulation of the emulsion or dispersion is usually accomplished by use of magnesium, barium, or other metallic salts resulting in two distinct problems. First, they add metallic contamination to the elastomeric crumb and second, the metallic salts of the perfluoro carboxylic acids become much more difficult to remove from the crumb.

The prior art further teaches compounding the perfluoroelastomer, for example, on a roll mill, Banbury mixer, extruder, or the like. In this step, crosslinking catalysts or other additives may be mixed with the perfluoroelastomer crumb in the melt to facilitate sufficient crosslinking as may be required by the application. For example, one goal may be to attain sufficient crosslinking to achieve good high temperature compression set resistance. Compounding may actually result in the addition of metallic and/or other contaminants by the direct addition via additives; additionally high temperature melt compounding often results in metal contamination by corrosion of the compounding equipment and exposure to environmental contamination. If organic crosslinking agents are used, the resulting articles are usually brown due to thermal decomposition of the agents.

Perfluoroelastomer articles such as seals, O-rings, and valve packings are often highly filled with carbon black or metallic fillers for reinforcement rendering them opaque and providing an additional source of contamination. When exposed to plasmas in end uses such as semiconductor manufacturing, the polymeric component of these articles is etched away, leaving the fillers as undesirable particle contaminants. Furthermore, as the polymer decomposes any fillers such as metals, metal oxides or metal salts originally contained in articles may be released.

Recent patents of Saito et al. and Coughlin and Wang (U.S. Pat. No. 5,565,512, and WO 02/48200) have discussed the value of producing clear and pure perfluoroelastomer parts with low metal ion contamination. Market forces that are driving the move to clear, clean perfluoroelastomer parts include both the semi conductor industry and the pharmaceutical industry which desires extremely low concentrations of metals. In addition, the pharmaceutical and biotechnology industries desire overall purity and elimination of certain perfluoro carboxylic acids which accumulate in the body is highly desirable. For example, some companies manufacturing fluoropolymer resins or parts have established limits of perfluoro octanoic acid (PFOA), the acid form of ammonium perfluoro octanoate (APFO) which is a common surfactant used in fluoromonomer emulsion polymerization.

However, the need for crosslinkable perfluoroelastomers and crosslinked parts that have a low metallic ion contamination and a low perfluoro carboxylic concentration has not been met with the usual processes of forming these. Therefore, one embodiment of the present invention is a method for producing perfluoroelastomer compositions having low metallic ion contamination and low perfluoro carboxylic concentration.

SUMMARY OF THE INVENTION

This invention relates to crosslinkable perfluoroelastomers and cured perfluoroelastomer articles having low metallic ion concentration and a low concentration of residual fluorosurfactant, and inventive processes for making the same. In the absence of additives, transparent articles having high purity are produced by the methods of the present invention.

In one embodiment, methods of the present invention minimize contamination in part by minimizing corrosion that results from conventional polymerization processes performed in the presence of perfluorocarboxylic acid salt by using a non-metallic buffer and/or corrosion resistant vessel and/or lines. Corrosion resistant materials useful in the present invention include high Ni alloys, for example, Inconel® or Hastelloy® alloys. Processes of present invention may also solve the problem of contamination encountered by coagulation of the emulsion or dispersion using metallic salts. For example, by using nitric acid ($HNO_3$) or ammonium salts like $(NH_4)_2CO_3$ and $NH_4NO_3$ as coagulants, metallic contamination can be minimized or eliminated. Known methods for curing elastomeric resin may result in contamination by using compounding steps that add metallic and/or other contaminants, or by corrosion of the compounding equipment, or exposure to environmental contamination. It has been unexpectedly discovered that perfluoroelastomeric uncrosslinked gum, having a low concentration of perfluoro carboxylic acids or salt containing perfluoro cyano vinyl ether crosslink sites, such as 8-CNVE, can be cured in the mold at about 250° C., or greater than 250° C., without a compounding step and without the addition of any other chemicals.

Combining these inventive steps results in the production of crosslinked perfluoro elastomer parts having metallic ion contamination more than a factor of 100 or a factor of 1000 lower than currently known. For example, in one embodiment of the present invention crosslinked perfluoroelastomeric parts are produced having less than about 3 parts per million (ppm) or more preferably, less than about 0.5 ppm metallic ion. The concentration of perfluoro carboxylic acid also may be less than about 2 ppm, or less than about 1 ppm. Advantageously, crosslinked parts of the present invention may have compression set values measuring less than or equal to about 35% at about 200° C. Preferred crosslinked parts are transparent and colorless.

DESCRIPTION OF THE FIGURES

FIG. 1. Curing kinetics of samples according to Example 2 obtained at 250° C.

FIG. 2. Curing kinetics of samples according to Example 4 obtained at 250° C.

DETAILED DESCRIPTION OF THE INVENTION

In one embodiment, the present invention is directed to a composition comprising a crosslinkable perfluoroelastomer terpolymer consisting essentially of TFE, PAVE and a cure site monomer having at least one nitrile-containing group; thus, the crosslinkable composition forms a crosslinked terpolymer without additional materials such as crosslinking agents and the like. The present invention is further directed to methods of making the crosslinkable terpolymer, methods of crosslinking the terpolymer in the absence of a crosslinking agent, and articles made therefrom.

In one embodiment, perfluoroelastomers of the present invention may comprise crosslinkable terpolymers polymerized from monomer units consisting essentially of TFE, PAVE, and perfluorocyano vinyl ether. In one embodiment the PAVE monomer is perfluoromethylvinyl ether (PMVE), however, other suitable perfluorinated vinyl ethers may also be selected from monomers, or mixtures of monomers, of the formula $$CF_2=CFO(R_f'O)_n(R_f'O)_mR_f \qquad (I)$$

where Rf' and Rf'' are different linear or branched perfluoroalkylene groups of 2-6 carbon atoms, m and n are independently 0-10, and Rf is a perfluoroalkyl group of 1-6 carbon atoms.

Another class of perfluorovinyl ethers for use in the present invention includes compositions of the formula $$CF_2=CFO(CF_2CFXO)_nR_f \qquad (II)$$

where X is F or $CF_3$, n is 0-5, and Rf is a perfluoroalkyl group of 1-6 carbon atoms.

A further class of perfluorovinyl ethers includes those ethers wherein n is 0 or 1 and Rf contains 1-3 carbon atoms. Examples of such perfluorinated ethers include PMVE, perfluoroethyl vinyl ether (PEVE) and perfluoropropyl vinyl ether (PPVE). Other useful monomers include compounds of the formula $$CF_2=CFO[(CF_2)_mCF_2CFZO]_nR_f \qquad (III)$$

where Rf is a perfluoroalkyl group having 1-6 carbon atoms, m=0 or 1, n=0-5, and Z=F or $CF_3$. Preferred members of this class are those in which Rf is $C_3F_7$, m=0, and n=1.

Additional perfluorovinyl ether monomers for use in the present invention may include compounds of the formula $$CF_2=CFO[(CF_2CFCF_3O)_n(CF_2CF_2CF_2O)_m(CF_2)_p] \\ C_xF_{2x+1} \qquad (IV)$$

where m and n independently=1-10, p=0-3, and x=1-5. Preferred members of this class include compounds where n=0-1, m=0-1, and x=1.

Another example of a useful perfluorovinyl ether includes $$CF_2=CFOCF_2CF(CF_3)O(CF_2O)_mC_nF_{2n+1} \qquad (V)$$

where n=1-5, m=1-3, and where, preferably, n=1.

Crosslinkable terpolymers of the present invention have cure site monomers containing at least one nitrile group. In one embodiment, the monomers include fluorinated olefins containing at least one nitrile group, and in another embodiment, the monomers comprise nitrile-containing fluorinated vinyl ethers, including those having the following formulae.

$$CF_2=CF-O(CF_2)_n-CN \qquad (VI)$$

where n=2-12, preferably 2-6;

$$CF_2=CF-O[CF_2-CFCF_3-O]_n-CF_2-CF \\ (CF_3)-CN \qquad (VII)$$

where n=0-4, preferably 0-2;

$$CF_2=CF-[OCF_2CF(CF_3)]_x-O-(CF_2)_n-CN \qquad (VIII)$$

where x=1-2, and n=1-4; and $$CF_2=CF-O-(CF_2)_n-O-CF(CF_3)CN \qquad (IX)$$

where n=2-4. Particularly preferred cure site monomers are perfluorinated polyethers having a nitrile group and a trifluorovinyl ether group, including perfluoro(8-cyano-5-methyl-3,6-dioxa-1-octene), $$CF_2=CFOCF_2CF(CF_3)OCF_2CF_2CN \qquad (X).$$

Preferred perfluoroelastomer compositions of the present invention are comprised of a crosslinkable terpolymer consisting essentially of units of TFE, PAVE and cure site units having at least one nitrile-containing group, where in one embodiment PAVE is PMVE and further, wherein 8-perfluorocyano vinyl ether (8-CNVE) is the nitrile-containing cure site monomer. The crosslinkable terpolymer may be polymerized from the above monomers by known methods including those described in WO 02/060968 to Coggio et al. which is hereby incorporated by reference herein, and further, methods as described in detail in the examples presented below. In one embodiment, crosslinkable perfluoroelastomer terpolymers consist essentially of approximately from 38 to 81.7 mole percent TFE, 18 to 58 mole percent PAVE, and 0.3 to 4 mole percent of a nitrile-containing cure site monomer. Other crosslinkable terpolymers of the present invention consist essentially of about 47 to 80 mole percent TFE, 19 to 50 mole percent PAVE, and 1 to 3 mole percent nitrile-containing cure site monomer.

After polymerization to form crosslinkable terpolymers of the present invention, the gum may be further processed with a finishing step as described in Example 1 below which may facilitate the elimination of some contaminants.

In one embodiment, the highly pure crosslinkable terpolymers have low metal ion content (or metal contamination), as well as low fluorosurfactant concentration. The metal content of the crosslinkable terpolymer is less than 200 ppm, and preferably less than 3000 parts per billion (ppb), also preferred less than about 2000 ppb, further preferred less than about 1000 ppb, more preferably less than about 500, and most preferably less than about 200 ppb when measured according to the methods described herein for determining metal content. The metal content of preferred crosslinked terpolymer is also less than 200 ppm, preferably less than 3000 ppb, more preferably less than about 2000 ppb, further preferred less than about 1000 ppb or less than about 500 ppb when measured according to the methods described herein for determining metal content. In one embodiment, the fluorosurfactant concentration is preferably less than 2 ppm for one or both of the uncrosslinked and crosslinked terpolymer, when measured according to the methods described herein. Preferably, the concentration of perfluoro carboxylic acid may be less than about 2 ppm, and less than 1 ppm. Uncrosslinked and crosslinked terpolymers may have a fluoro sulfonic acid concentration of less than about 2 ppm, or less than 1 ppm. APFO concentrations of uncrosslinked and crosslinked compositions may be less than 2 ppm or in a further embodiment less than 1 ppm.

The present invention is further directed to a process for making highly pure crosslinked perfluoroelastomeric articles. One embodiment of the present invention comprises a method comprising heating a composition comprising a crosslinkable terpolymer consisting essentially of TFE, PAVE, and nitrile-containing cure-site monomer units, to form highly pure crosslinked composition to which no crosslinking agents have been added. One method comprises:

1) forming a composition comprising a crosslinkable perfluoroelastomeric terpolymer of the present invention consisting essentially of a) TFE, b) PAVE, and c) nitrile-containing cure site monomer;

2) shaping the crosslinkable perfluoroelastomeric terpolymer composition;

3) heating said shaped perfluoroelastomeric terpolymer composition, and 4) crosslinking the perfluoroelastomer terpolymer by heating, wherein the process is performed without adding or, in the absence of, a crosslinking agent.

The method of the present invention may include shaping by molding or other fabrication techniques by means that do not introduce significant metallic contamination.

In one embodiment, the method comprises heating and crosslinking the terpolymer having units with nitrile-containing cure sites in the absence of, or without the addition of, one or more crosslinking agents, until sufficient crosslinking is achieved. Crosslinking agents including coagents, catalysts, and the like (such as peroxides, isocyanurates, ammonia-generating compounds, and bisamidoxime) that are typically used for curing crosslinkable polymers, impart contaminants, and are not necessary for crosslinking terpolymers using the novel methods of the present invention. The exclusion of these crosslinking agents from the method of the present invention results in crosslinked compositions having higher purity than achieved by currently known methods. Preferred crosslinked perfluoroelastomers are translucent or transparent after heating.

In one embodiment, the method comprises heating and crosslinking shaped perfluoroelastomer to greater than or equal to about 250° C. in the absence, or without the addition of crosslinking agents or additives, until sufficient crosslinking is achieved; in a further embodiment, the method comprises heating to greater than or equal to about 300° C., in the absence of, or without the addition of, crosslinking agents. Heating and crosslinking are maintained at temperatures and for times sufficient to cure the terpolymer to a desired level. In a further embodiment, the heating and crosslinking are continued for times and temperatures necessary to obtain a specific compression set. For example, the method comprises heating and crosslinking until a crosslinked terpolymer or shaped article is formed having a compression set of less than or equal to about 50% when tested at about 200° C. according to the method described herein. In other embodiments the method comprises heating and crosslinking until a crosslinked terpolymer or shaped article has a compression set of less than or equal to about 40%, less than or equal to about 35%, less than or equal to about 30%, or less than or equal to about 10% when tested at about 200° C. according to the method used herein, and described below. A crosslinkable terpolymer composition may be heated, for example, for about 30 minutes or greater, or for about 60 minutes or greater, at a temperature of greater than about 250° C. or greater than or equal to about 300° C., to achieve these properties. Preferred crosslinked compositions of the present invention have a compression set less than or equal to about 40%, and more preferably less than or equal to about 35%, when tested at about 200° C. according to the method described herein.

For use in evaluating the crosslinked compositions, compression set is measured according to ASTM D 395-01 Method B, at approximately 25% deflection, for about 70 hours in air. Articles are taken off from the testing device and reheated to the testing temperature for one (1) hour and measured.

Articles made from the perfluoroelastomer terpolymer of the present invention are useful in applications requiring higher purity than can be obtained by currently known methods. A few uses of articles formed from compositions of the present invention include gaskets such as o-rings, tubes, diaphragms, seals and the like. Crosslinkable terpolymers of the present invention may be shaped and cured directly into usable articles.

Test Methods

APFO Analysis

The methanolic HCl derivitization method is used to change the APFO form from the salt or carboxylic acid into its methylester derivative. This form is easily analyzed via Gas Chromatography (GC).

The APFO in about 1 g polymer is extracted and derivatized into 10 ml Methanolic HCl (Part # 33050-U, Supelco) over two hours at 55° C. The derivative mixture is then combined with 20 ml of half saturated NaCl/aqueous solution (98+%, Sigma Aldrich) and 10 ml n-Hexane (99+%, Sigma Aldrich). The derivative is extracted into the Hexane layer, which is then removed for GC analysis.

The GC analysis is performed splitless using a non-polar column and an Electron Capture Detector (Examples 2, 3 and 4).

EXAMPLES

Example 1

An aqueous emulsion containing 10 g 8-CNVE [$CF_2$=CF—O—($CF_2$)$_3$—O—CF($CF_3$)—CN], 135 g deionized (DI) water and 5 g 20 wt % ammonium perfluorooctanoate (APFO) aqueous solution was prepared by using an Omini Mixer Homogenizer (Omini International Co.) for 5 minutes. This solution is designated as "stock solution A".

Approximately 1500 g DI water, 300 g 20 wt % APFO aqueous solution and 16 g 8-CNVE were charged into an oxygen-free 4-liter reactor. Then, 190 g TFE and 300 g PMVE were added into the reactor. The reactor was then heated to 70° C. under 2285 KPa and the polymerization reaction was initiated by feeding 202 g ammonium persulfate (APS) aqueous solution (2 g APS dissolved in 200 g DI water) within 2 minutes. As the reaction pressure decreased to 1800 KPa, 105 g stock solution A with 120 g DI water and 20 g TFE were charged into the reactor within 3 minutes. Then, 150.5 g APS solution (0.5 g APS dissolved in 150 DI water) was fed into the reactor within 1 minute. As the reaction pressure decreased to 1600 KPa, 45 g stock solution A with 150 g DI water and 20 g TFE were charged into the reactor within 1 minute. Then, 150.5 g APS solution (0.5 g APS dissolved in 150 g DI water) was added into the reactor within 1 minute. The polymerization reaction was stopped after 221 minutes from the initiation of the reaction under 518 KPa. The reactor was cooled and the residual gas was purged. The emulsion latex containing 16.9 wt % solids was obtained.

Finishing Process 1:

Approximately 10 ml nitric acid (minimum 65%, semiconductor grade, Riedel-deHaen) was introduced into 200 ml of the emulsion latex (prepared substantially according to Example 1) in a polypropylene (PP) beaker with stirring at room temperature. The liquids were decanted and then the precipitated solids were immersed in 200 ml methanol (semiconductor grade, Riedel-deHaen) at room temperature. After 24 hours, the methanol was decanted and the polymer was washed with 200 ml methanol (semiconductor grade, Riedel-deHaen). The polymer was dried at 120° C. for 12 hours in a convection oven.

Finishing Process 2:

The procedure is the same as the above, but the nitric acid used was an ACS reagent grade (70%, Aldrich) and the methanol used was a PRA grade (99.9%, Aldrich).

The 2 dried polymer samples were analyzed by Inductively Coupled Plasma-Mass Spectroscopy (ICP-MS) for 16 metal elements. Table 1 lists the metal ion levels in the polymers.

Solid-state $^{19}$F NMR was carried out to characterize the composition of the polymer. This polymer sample contained 62.4 mol % TFE, 36.6 mol % PMVE and 1.0 mol % 8-CNVE.

Example 2

An aqueous solution containing 10 g 8-CNVE [$CF_2$=CF—O—($CF_2$)$_3$—O—CF($CF_3$)—CN], 136 g DI water and 4 g of 20 wt % APFO aqueous solution was prepared by using an Omini Mixer Homogenizer for 5 minutes. This solution is designated as "stock solution B".

Approximately 1500 g DI water, 300 g 20 wt % APFO aqueous solution and 16 g 8-CNVE were charged into an oxygen-free 4-liter reactor. Then, 190 g TFE and 320 g PMVE were added into the reactor. The reactor was then heated to 70° C. under 2347 KPa and the polymerization reaction was initiated by feeding 200.5 g APS aqueous solution (0.5 g APS dissolved in 200 g DI water) within 1 minute. As the reaction pressure decreased to 1900 KPa, 105 g stock solution B with 120 g DI water and 20 g TFE were charged into the reactor within 2 minutes. As the reaction pressure decreased to 1700 KPa, 45 g stock solution B with 150 g DI water and 20 g TFE were charged into the reactor within 2 minutes. The polymerization reaction was stopped after 367 minutes from the initiation of the reaction under 600 KPa. The reactor was cooled and the residual gas was purged. The emulsion latex containing 18.2 wt % solids was obtained.

Approximately 400 ml of the emulsion latex was coagulated at room temperature with 20 ml nitric acid (70%, ACS reagent, Aldrich) in a PP beaker. The liquids were decanted and then the precipitated material was immersed in 400 ml methanol (99.9%, PRA grade, Aldrich) for 24 hours at room temperature. Then, the methanol was decanted and the material was washed with 400 ml methanol (99.9%, PRA grade, Aldrich). The methanol was decanted and the washed material was dried at 70° C. for 48 hours in a convection oven.

The APFO residual detected from the polymer was 0.3 ppm. Solid-state $^{19}$F NMR showed it had 61.7 mol % TFE, 37.3 mol % PMVE and 1.0 mol % 8-CNVE.

An ARES rheometer (Rheometrics) was used to monitor the curing process. Disks having an 8 mm diameter and about a 0.8 mm thickness were molded from the polymer at 100° C. for 2 minutes. A disk was placed between two 8 mm diameter parallel plates at 60° C. for 100 seconds and then heated to a setting curing temperature from a starting temperature of 60° C. at a heating rate of 80° C./min. Curing was carried out at a frequency of 10 rad/second, a strain of 0.1% and a setting temperature in air. Torque and Tan δ=G"/G' were monitored with time, where G' is the storage shear modulus and G" the loss shear modulus. Its curing curve is shown in FIG. 1.

The crumb polymer was molded into AS-568A K214 (Aerospace Standard O-ring size) O-rings at 300° C. and 1727 psi for 1 hour and then were postcured in air at 300° C. for 24 hours. The O-rings made were transparent.

Compression set was measured on O-rings largely based on ASTM D 395-01 Method B. However, the ASTM method does not have a quantitative time or temperature scale as to how soon or at what temperature the tested specimens should be taken off from the testing device. Different compression set values can be obtained when tested specimens are taken off from the testing device at different temperatures. To avoid this issue, tested specimens taken off from the testing device were reheated to the testing temperature for 1 hour, and then measured according to ASTM D 395-01, i.e., cooling for 30 minutes, etc. The compression set value is given in Table 2.

Example 3

An aqueous solution containing 10 g 8-CNVE [$CF_2$=CF—O—($CF_2$)$_3$—O—CF($CF_3$)—CN], 480 g DI water and 10 g 20 wt % APFO aqueous solution was prepared by using an Omini Mixer Homogenizer for 5 minutes. This solution is designated as "stock solution C".

Approximately 1500 g DI water, 300 g 20 wt % APFO aqueous solution and 16 g 8-CNVE were charged into an oxygen-free 4-liter reactor. Then, 260 g TFE and 300 g PMVE were added into the reactor. The reactor was then heated to 70° C. under 2584 KPa and the polymerization reaction was initiated by feeding 200.2 g APS aqueous solution (0.2 g APS dissolved in 200 g DI water) within 1 minute. Then, stock solution C was fed into the reactor as follows:

| Time after reaction initiation (in minutes) | Stock solution C added (in grams) |
|---|---|
| 2 | 60 |
| 16 | 60 |
| 28 | 60 |
| 40 | 60 |
| 51 | 50 |
| 61 | 60 |
| 72 | 60 |
| 83 | 80 |
| 98 | 10 |

As the reaction pressure decreased to 2120 KPa, 20 g TFE was charged into the reactor within 1 minute. Another 20 g TFE was added into the reactor within 1 minute as the reaction pressure decreased to 1920 KPa. The polymerization reaction was stopped after 219 minutes from the initiation of the reaction under 1200 KPa. The reactor was cooled and the residual gas was purged. The emulsion latex containing 15.9 wt % solids was obtained.

The coagulation process was substantially the same as the first finishing process as shown in Example 1. The polymer was dried at 70° C. for 48 hours in a convection oven.

The dried polymer sample was analyzed by ICP-MS for 16 metal elements. Table 1 lists the metal ion levels in the polymer.

The APFO residual detected from the polymer was 1.2 ppm. This polymer had 74.9 mol % TFE, 24.2 mol % PMVE and 0.9 mol % 8-CNVE, as determined by solid-state $^{19}$F NMR.

The crumb polymer was molded into AS-568A K214 O-rings, heating at 300° C. and 1658 psi for 5 minutes, and then was postcured in air at 250° C. for 24 hours. The O-rings made were transparent. The compression set value is given in Table 2. The crumb polymer was also molded and cured into 1 mm thick films between Kapton® films under the same molding, heating and postcuring condition. The purity of the crosslinked film is shown in Table 1.

Example 4

Approximately 1800 g DI water and 180 g 20 wt % APFO aqueous solution were charged into an oxygen-free 4-liter reactor. Then, 3.6 g 8-CNVE [$CF_2$=CF—O—($CF_2$)$_5$—CN], 76 g PMVE and 62.8 g TFE were added into the reactor.

The reactor was heated to 60° C., and then the mixture of TFE with PMVE (55/45, wt/wt) was charged into the reactor until the pressure increased to 920 KPa. Then 200 ml aqueous solution containing 6 g APS and 4 g 25 wt % ammonium sulfite was added into the reactor to initiate the polymerization reaction.

Once the initiation reaction started, 8-CNVE was continuously charged into the reactor at a rate of 0.143 g/min, and the mixture of TFE with PMVE (55/45 wt/wt) was also continuously supplied to the reactor to maintain the reaction pressure at 930-950 KPa.

After 440 minutes from the start of the reaction initiation, the supply of 8-CNVE and the mixture of TFE with PMVE was then stopped. The reactor was kept in that state for another hour. Then reactor was cooled and the residual gas was purged. The emulsion latex containing 27.5 wt % solids was obtained.

The coagulation process is the same as the first finishing process as shown in Example 1. The polymer was dried at 70° C. for 48 hours in a convection oven.

The dried polymer sample was analyzed by ICP-MS for 16 metal elements. Table 1 lists the metal ion levels in the polymer.

The APFO residual detected from the polymer was 0.8 ppm. Solid-state $^{19}$F NMR was carried out to characterize the composition of the polymer. This polymer sample contained 69.6 mol % TFE, 29.2 mol % PMVE and 1.2 mol % 8-CNVE.

An ARES rheometer (Rheometrics) was used to monitor the curing process. Disks having an 8 mm diameter and about a 0.8 mm thickness were molded from the polymer at 100° C. for 2 minutes. A disk was placed between two 8 mm diameter parallel plates. Curing was carried out at a frequency of 10 rad/second, a strain of 0.5% and heating at about 250° C. in air. Torque and Tan $\delta$=G''/G' were monitored with time. Its curing curve is shown in FIG. 2.

The crumb polymer was molded into AS-568A K214 O-rings heating at 250° C. and 1727 psi for 30 min and then was postcured in air at 90° C. for 4 hours, 204° C. for 24 hours and 288° C. for 24 hours. The O-rings made were transparent. The compression set value is given in Table 2. The crumb polymer was also molded into 1 mm think films between Kapton® films under the same molding and postcuring condition. The purity of the crosslinked film is shown in Table 1.

TABLE 1

Metal ions detected in the crosslinkable polymers and the crosslinked parts.

| Metal Ions | Ex. 1 [1] Level Detected (ppb) | Ex. 1 [2] Level Detected (ppb) | Ex. 3 [3] Level Detected (ppb) | Ex. 3 [4] Level Detected (ppb) | Ex. 4 [5] Level Detected (ppb) | Ex. 4 [6] Level Detected (ppb) |
|---|---|---|---|---|---|---|
| Al | 1 | <1 | <1 | 12 | 1 | 8 |
| Ba | <1 | <1 | 1 | 1 | <1 | <1 |
| Ca | 37 | 15 | 50 | 100 | 20 | 70 |
| Cr | 6 | <5 | <5 | <5 | <5 | 13 |
| Cu | <5 | <5 | <5 | <5 | <5 | <5 |
| Fe | 17 | 10 | <10 | <10 | <10 | 30 |
| Pb | <1 | <1 | <1 | <1 | <1 | <1 |
| Li | 1 | 3 | <1 | <1 | <1 | <1 |
| Mg | 1 | 1 | 18 | 29 | 12 | 23 |
| Mn | 1 | 1 | 2 | 3 | <1 | 2 |
| Ni | 36 | 37 | 16 | 14 | 27 | 33 |
| K | 11 | <10 | <10 | <10 | <10 | 10 |
| Na | 70 | 8 | 22 | 26 | 9 | 200 |
| Sr | <1 | <1 | <1 | <1 | <1 | <1 |
| Ti | <10 | <10 | <10 | <10 | <10 | <10 |
| Zn | <10 | <10 | <10 | <10 | <10 | <10 |

[1] The polymer obtained by finishing process 2.
[2] The polymer obtained by finishing process 1.
[3] The crumb polymer.
[4] The crosslinked film.
[5] The crumb polymer.
[6] The crosslinked film.

TABLE 2

Compression set values.

| | Compression set, %* |
|---|---|
| Example 2 | 65 |
| Example 3 | 35 |
| Example 4 | 7 |

*25% deflection, 70 hours in air at about 204° C.

We claim:
1. A composition comprising
a crosslinkable perfluoroelastomer composition consisting essentially of
a terpolymer of tetrafluoroethylene (TFE), perfluoroalkyl vinyl ether (PAVE) and
perfluoro cyano vinyl ether (CNVE) that contains no additional crosslinking agent, coagent or catalyst, and wherein the crosslinkable perfluoroelastomer composition has less than about 3000 ppb metal content, and further wherein the composition, when crosslinked has a compression set less than or equal to about 50% when tested at about 200° C., and is crosslinkable without an additional crosslinking agent, coagent or catalyst.

2. The composition of claim 1, wherein the crosslinkable perfluoroelastomer has less than about 1000 ppb metal content.

3. The composition of claim 1, wherein the crosslinkable perfluoroelastomer has less than about 500 ppb metal content.

4. The composition of claim 1, wherein the crosslinkable perfluoroelastomer has less than about 200 ppb metal content.

5. The composition of claim 1, wherein PAVE is perfluoromethyl vinyl ether (PMVE).

6. The composition of claim 1, wherein PAVE is perfluoroethyl vinyl ether (PEVE).

7. The composition of claim 1, wherein PAVE is perfluoropropyl vinyl ether (PPVE).

8. The composition of claim 1 wherein the perfluoro cyano vinyl ether is 8-CNVE.

9. The composition of claim 1, wherein the crosslinkable perfluoroelastomer comprises 0.3-3 mol % CNVE.

10. An article comprising the crosslinked perfluorelastomer composition of claim 1.

11. The article of claim 10, wherein the article is a gasket.

12. The article of claim 10, wherein the article is a tube.

13. The article of claim 10, wherein the article is a diaphragm.

14. The article of claim 10, wherein the article is a seal.

15. The composition of claim 1, wherein the crosslinkable polymer has a fluorosurfactant concentration of less than 2 ppm.

16. The composition of claim 1, wherein the crosslinkable polymer has a fluorosurfactant concentration of less than 1 ppm.

17. The composition of claim 1, wherein the crosslinkable polymer has a carboxylic acid surfactant concentration of less than 2 ppm.

18. The composition of claim 1, wherein the crosslinkable polymer has a carboxylic acid surfactant concentration of less than 1 ppm.

19. The composition of claim 1, wherein the crosslinkable polymer has a fluoro sulfonic surfactant concentration of less than 2 ppm.

20. The composition of claim 1, wherein the crosslinkable polymer has a fluoro sulfonic acid surfactant concentration of less than 1 ppm.

21. The composition of claim 1, wherein the crosslinkable polymer has a fluorosurfactant concentration of less than 2 ppm when crosslinked.

22. The composition of claim 1, wherein the crosslinkable polymer has a fluorosurfactant concentration of less than 1 ppm when crosslinked.

23. The composition of claim 1, wherein the crosslinkable polymer has a carboxylic acid surfactant concentration of less than 2 ppm when crosslinked.

24. The composition of claim 1, wherein the crosslinkable polymer has a carboxylic acid surfactant concentration of less than 1 ppm when crosslinked.

25. The composition of claim 1, wherein the crosslinkable polymer has a fluoro sulfonic surfactant concentration of less than 2 ppm when crosslinked.

26. The composition of claim 1, wherein the crosslinkable polymer has a fluoro sulfonic acid surfactant concentration of less than 1 ppm when crosslinked.

27. The composition of claim 1, wherein the crosslinkable perfluoroelastomer has less than about 2000 ppb metal content when crosslinked.

28. The composition of claim 1, wherein the crosslinkable perfluoroelastomer has less than about 1000 ppb metal content when crosslinked.

29. The composition of claim 1, wherein the crosslinkable perfluoroelastomer has less than about 500 ppb metal content when crosslinked.

30. The composition of claim 1 having a compression set of less than or equal to about 35% when crosslinked.

* * * * *